United States Patent Office 3,458,917
Patented Aug. 5, 1969

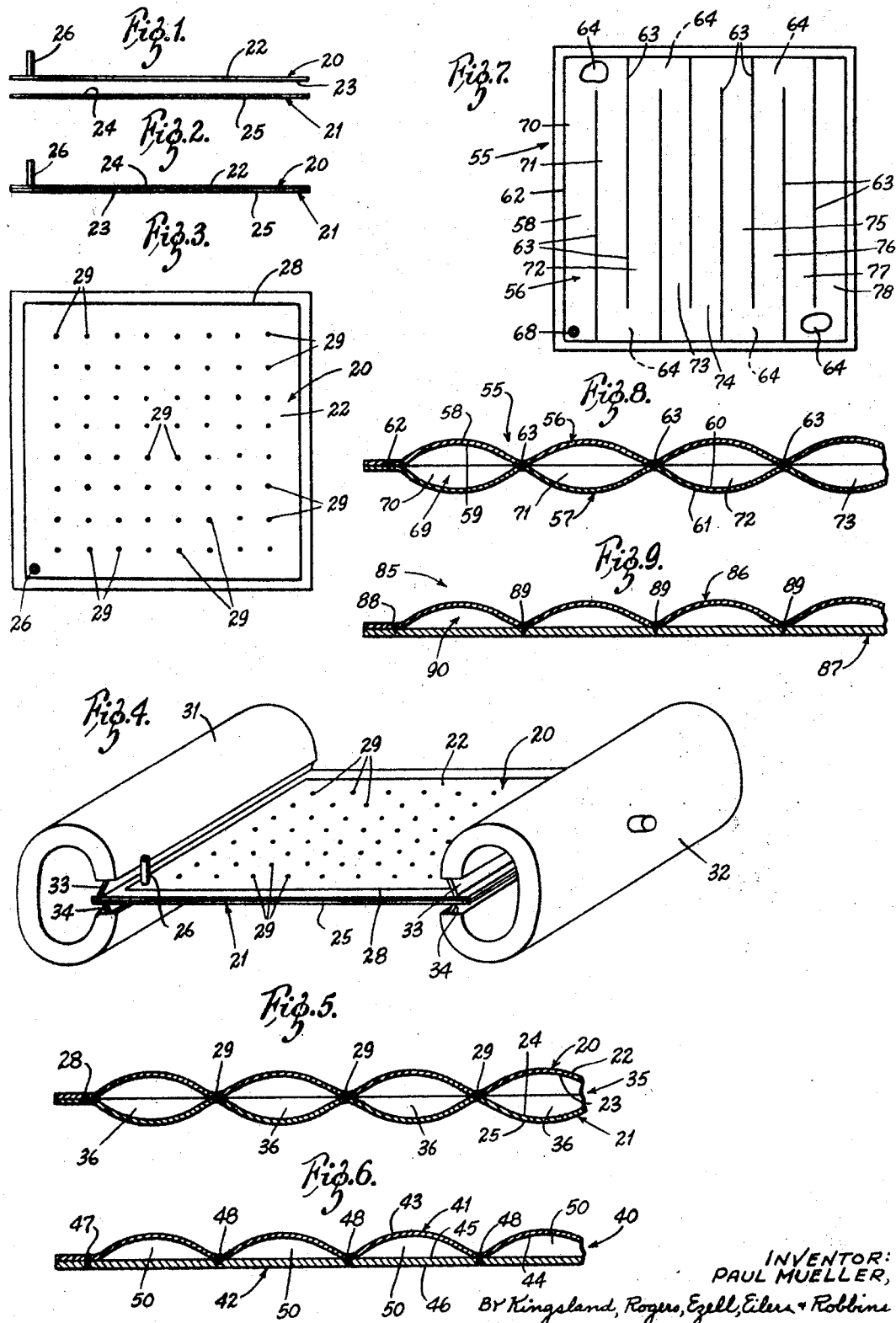

3,458,917
METHOD OF FABRICATING METAL SHEETS WITH FLUID PASSAGES
Paul Mueller, Springfield, Mo., assignor to Paul Mueller Company, Springfield, Mo., a corporation of Missouri
Filed Jan. 3, 1966, Ser. No. 518,465
Int. Cl. B21d 53/00; B23p 15/26
U.S. Cl. 29—157.3                    7 Claims

ABSTRACT OF THE DISCLOSURE

A method of forming fluid passages in sheets by inflating unwelded portions of the plates between welded portions while the sheets are held under tension.

---

This invention relates to the production and manufacture of metal plates having fluid pockets or passages in them of selected patterns. The invention may be used for various purposes, such as for the formation of tank wall, submerged in a liquid, strapped to a vessel or as a surface heat exchange plate through which heat transfer media is to flow. Basically, the assembly is comprised of two metal sheets welded together at different places to outline fluid passages, one or both of the sheets being embossed depending upon whether a flat surface on one side is needed. The plate thus formed can then be curved to form the curved wall of a tank or can be left straight as required.

The particular feature of this invention is the method of forming these double plate heat transfer surfaces with the fluid passages. The conventional method of doing this is to emboss one or both of the plates to the pattern which is to define the fluid passages and to weld the peaks of the embossings to one another to close the passages and to form the double plate heat transfer surfaces. This conventional method requires expensive dies and therefore is limited in preparation of sizes and shapes of passages to those dies that are available. In the present invention, two sheets of metal are placed together face-to-face and are welded in a desired pattern which may be any pattern determined by a selected pattern of fluid passages. If the passages are to be a serpentine formation, straight-line welds to form such a serpentine coil may be made. Spot welds may be made to form flooded type heat transfer surface. Parallel welds may be made to form a parallel-type heat transfer surface. There are no limitations to the shapes of the passages.

Once the sheets are welded together in the desired pattern, opposing edges are placed in a conventional sheet metal stretcher leveller and are placed under slight tension. Then high pressure fluid in introduced into the space between the sheets to cause "pillowing" of one or both of the sheets, depending upon their relative thicknesses, and the pressure applied. With the pressure maintained between the sheets, they are stretched further beyond their yield points, and then the sheets are released from the stretcher, the high pressure fluid between them having maintained the "pillowing" effect. The result is the desired fluid conveying heat transfer surface.

The principal object of this invention is to provide a method for forming a heat transfer surface having channels or fluid passages in it without requiring expensive dies and without producing warpage. Specifically, an object of the invention is to provide a method of forming such heat transfer surfaces using a combination of steps, including welding the flow pattern, and holding the sheets under tension while applying internal fluid pressure to the space between the sheets to cause them to "pillow" and form the desired pattern, the stretching preventing warping of the sheets.

Another object of the invention is to provide a method which is inexpensive and yet permits formation of metal heat transfer surfaces having fluid channels in them of any selected path, size and shape.

Other objects and advantages will be apparent to those skilled in the art.

In the drawing:

FIGURE 1 is an end elevation view of two sheets adapted to be welded together;

FIGURE 2 is an end elevation view of the two sheets of FIGURE 1 positioned together and welded;

FIGURE 3 is a top plan view of the welded sheets of FIGURE 2;

FIGURE 4 is an enlarged isometric view showing the sheets of FIGURE 3 in a stretcher leveller (shown schematically);

FIGURE 5 is an enlarged view in section of a finished product wherein the two sheets are of equal thickness;

FIGURE 6 is an enlarged view in section showing the sheets of the finished product wherein the sheets are of unequal thickness;

FIGURE 7 is a top plan view of the welding of two sheets on a modified selected pattern;

FIGURE 8 is an enlarged view in section through the sheets of FIGURE 7 wherein the sheets are of equal thickness; and FIGURE 9 is an enlarged view in section showing the sheets of FIGURE 7 wherein the sheets are of unequal thickness.

Referring now to the drawing, the heat transfer surface of this invention is made by starting with two plates 20 and 21, as shown in FIGURE 1. The plate 20 has upper and lower surfaces 22 and 23, and the plate 21 has upper and lower surfaces 24 and 25. A suitable filler tube 26 is fastened to the plate 20 to admit fluid under pressure, such as oil or another liquid, air or another gas, as will be described.

The metal sheets 20 and 21 are placed together in face-to-face relationship with their surfaces 23 and 24 in contact, as shown in FIGURE 2, and a desired welded pattern is made, such as that shown in FIGURE 3. In the welded pattern of FIGURE 3, there is a continuous weld 28 entirely surrounding the central portions of the sheets 20 and 21, and there are a large number of spot welds 29 arranged in a rectangular pattern over the area within the surrounding welded seam 28.

After the welds 28 and 29 are made, the sheets 20 and 21 may be polished if polishing is required of the finished product. This polishing may be done while the sheets are in the flat condition and therefore can be done on conventional sheet metal polishers.

After welding, and after polishing if there is polishing, the sheets 20 and 21 are placed in the opposing jaws or clamps 31 and 32 of a standard stretcher-leveller, a machine used in steel mills to produce flat sheets for use in such things as panel work. In such a standard or conventional machine, the jaws 31 and 32 are movable toward and away from one another upon the application of hydraulic or mechanical moving means (not shown) to stretch the sheet materials clamped between them. As shown in FIGURE 4, each of the clamps 31 and 32 has a pair of jaws 33 and 34 which can be clamped to opposite edges of the doubled sheets 20 and 21. The jaws 33 and 34 are adjustable, and once the sheets 20 and 21 are gripped, the clamping arms 31 and 32 are moved away from one another to put the sheets 20 and 21 under slight tension which may stretch the sheets 20 and 21 slightly, but definitely not beyond their yield points.

While the sheets 20 and 21 are held under tension between the clamping arms 31 and 32, fluid, such as oil or other liquid, air or other gas, is introduced into the pressure port 26, and under this high pressure fluid, the portions of the sheets 20 and 21 between the spot welds 29 separate or "pillow" to create a heat transfer surface 35 having a plurality of pockets or "pillows" 36 as shown in FIGURE 5. With the pockets 36 being in direct communication with one another, the wall 35 thus formed becomes a flooded type heat transfer wall in which heat transfer media may flow more or less randomly. This is a well known kind of heat transfer wall, and the foregoing method produces a superior wall at reduced cost. The great cost of the forming dies is eliminated, and the method of "pillowing" to form the pockets 36 creates pockets of maximum size without flattened areas immediately adjacent the weld points 29.

After the pockets 36 have been formed, and while the fluid pressure is still maintained in the inlet 26, the clamping arms 31 and 32 are moved further apart to stretch the metal sheets 20 and 21 beyond their yield points to minimize spring-back. The sheets are then released from the clamping arms 31 and 32.

FIGURE 6 shows a section view of another type heat transfer surface 40 of somewhat different form from the heat transfer surface 35. The heat transfer surface 40 is formed of two metal sheets 41 and 42, the sheet 41 having upper and lower surfaces 43 and 44 and the sheet 42 having upper and lower surfaces 45 and 46. However, the sheet 41 is thinner than the sheet 42. Hence, when the sheets 41 and 42 are fastened together by a peripheral weld 47 corresponding to the weld 28 and by a plurality of spot welds 48 within the area of the peripheral weld 47 and corresponding to the spot welds 29, and when the spaces between the spot welds 48 are "pillowed" as has been described to form pockets 50, the heat transfer surface 40 looks like the one shown in FIGURE 6. This heat transfer surface has one flat surface 46 because the sheet 42 being thicker than the sheet 41 does not expand under the applied fluid pressure. Thus the heat transfer surface 40 can be used when a flooded type heat transfer surface is needed but a smooth outer surface is required.

FIGURES 7 and 8 show another heat transfer surface 55 which is formed of two sheets 56 and 57 of equal thicknesses, the sheet 56 having upper and lower surfaces 58 and 59, and the sheet 57 having upper and lower surfaces 60 and 61. The sheets 56 and 57 are fastened together by a peripheral continuous weld 62 and by alternate weld lines 63 which start from alternate sides of the peripheral weld 62, as shown in FIGURE 7. These weld lines 63 terminate at a point spaced from the peripheral weld to provide alternate passages 64.

The heat transfer surface 55 is formed in the manner which has been described for the heat transfer surface 35 using the stretching clamping arms 31 and 32 and applying pressure. The filler tube 68 has been welded on the sheet 56. The peripheral weld 62 and the straight-line welds 63 form a continuous serpentine path 69 running successively from the legs 70, 71, 72, 73, 74, 75, 76, 77, and 78, and including the spaces 64 at the ends of the weld lines 63.

Since the sheets 56 and 57 are equal thickness, the serpentine path 69 is formed by bulges in both the sheets 56 and 57, as shown in FIGURE 8.

FIGURE 9 shows another form of heat transfer surface 85 having upper and lower sheets 86 and 87 of unequal thicknesses held together by a peripheral weld 88 corresponding to the weld 62 of FIGURE 7 and by alternate straight-line welds 89 corresponding to the welds 63. This forms a continuous serpentine passage 90 corresponding to the passage 69 in the heat transfer surface 55. Since the sheets 86 and 87 are of unequal thicknesses, a smooth "unpillowed" sheet 87 results for the heat transfer surface 85, and the heat transfer surface 85 can be used where one smooth surface is required. The heat transfer surfaces 35, 40, 55 and 85 are in common use in such applications as part of a tank wall, submerged in a liquid, strapped to a vessel, or as a surface heat exchange plate.

The heat transfer surfaces 35, 40, 55 and 85 are only examples of the different kinds of heat transfer surfaces which may be made according to the invention. Any form, shape and size of fluid passages may be created by this method without the manufacture of expensive dies and without changing the essential steps of the inventive method.

Various changes and modifications may be made within the purview of this invention as will be readily apparent to those skilled in the art. Such changes and modifications are within the scope and teaching of this invention as defined by the claims appended hereto.

What is claimed is:

1. A method of forming a fluid conveying heat transfer surface comprising the steps of welding parts of two metal sheets together in a weld pattern which forms outlines of a desired fluid passage pattern, thereafter placing the sheets under slight tension, introducing high pressure fluid into the spaces between the welds to expand those spaces while the sheets are held under slight tension, and releasing the sheets.

2. The method of claim 1 plus the step of increasing the tension applied to the sheet following the introduction of high pressure fluid.

3. The method of claim 1 wherein the sheets are of unequal thickness.

4. The method of claim 3 wherein the pressure applied is sufficient to expand the thinner of the sheets to create fluid passages but is insufficient to expand the thicker of the two sheets against the applied tension.

5. The method of claim 1 including the step of polishing at least one surface of the two sheets after the welding step and prior to the stretching step.

6. The method of claim 1 wherein the step of placing the sheets under slight tension comprises stretching the sheets slightly but definitely not beyond their yield points.

7. The method of claim 6 including the step of increasing the tension to stretch the sheets beyond their yield points after the step of introducing fluid.

References Cited

UNITED STATES PATENTS

| | | | |
|---|---|---|---|
| 1,709,865 | 4/1929 | Muffly. | |
| 2,690,002 | 9/1954 | Grenell. | |
| 2,741,447 | 4/1956 | Heal | 29—449 X |
| 2,982,013 | 5/1961 | Adams | 29—421 X |

JOHN F. CAMPBELL, Primary Examiner

D. C. REILEY, Assistant Examiner

U.S. Cl. X.R.
29—421, 113—118